Sept. 5, 1967 J. S. HANSON 3,340,518

MAGNETIC HEAD STRUCTURE

Filed Dec. 23, 1963 2 Sheets-Sheet 1

INVENTOR
JAMES S. HANSON

BY Ralph C. Austin
ATTORNEY 3,340,518
MAGNETIC HEAD STRUCTURE

James S. Hanson, Poughkeepsie, N.Y., assignor to International Business Machines Corporation, New York, N.Y., a corporation of New York
Filed Dec. 23, 1963, Ser. No. 332,660
5 Claims. (Cl. 340—174.1)

ABSTRACT OF THE DISCLOSURE

The magnetic head structure includes a first block having an optically flat surface in which recesses are formed to receive magnetic head members. A second block has wider recesses communicating with the recesses in the first block and receives head members having flat surfaces engagable with the flat surface on the first block. The adjacent faces of the head members are bonded together by glass. A spring acts on the head members in the wider recesses for holding them against the surface on the first block.

This invention relates to magnetic heads, and more particularly to a structure and method for mounting magnetic heads of a multitrack array in precise alignment.

When a plurality of magnetic heads are used in either writing information into, or reading information from, a number of tracks on a magnetic surface, it is essential that the head gaps be perfectly aligned with each other and remain in such alignment during extended periods of use. It is also desirable that a mounting for the heads be so designed as to permit replacement of any head which has become worn, damaged or otherwise inoperative, by a new head, and to obtain an exact alignment between the new head and those remaining in the mounting. The mounting should also permit individual adjustment of the heads within the plane of gap alignment without introducing gap alignment errors.

The practice followed by many in mounting heads in a multitrack matrix comprises an aligning of the heads with a temporary locating edge and then potting the heads in epoxy resin. Extending portions used in aligning the heads are then cut off and the exposed ends of the heads are lapped and polished to the desired contour. This technique does not always produce satisfactory results because the epoxy resin is not rigid enough to withstand the forces sometimes produced by sawing, lapping and polishing. The shrinkage and distortion of the epoxy taking place during setting is much greater than the permissible tolerance in gap alignment, and heat produced by friction with a high speed tape may cause it to become unstable. The epoxy is also easily contaminated by materials used in lapping or by particles wearing from a magnetic surface, and it is not possible to replace a head core in an epoxy-potted array if one if found to be defective.

To assure an exact alignment of head gaps in a multitrace matrix, each head may be constructed from two ferrite pieces of different widths, the faces of these being made optically flat and bonded together by a material which presents to the recording medium only a magnetic discontinuity. A supporting block having an optically flat surface at its face is provided with recesses in its face to receive the smaller pieces of the heads while the wider head pieces extend beyond both sides of the recess and engage the face of the supporting block. Another supporting block may be attached to the first and have means enclosed within it for holding each of the wider head pieces in engagement with the fact of the first supporting block.

An object of this invention is to provide an improved magnetic head arrangement.

Another object is to provide an improved mechanism for supporting magnetic heads in a multitrack matrix with their head gaps in exact alignment.

Still another object is to provide a plurality of magnetic heads supported with their head gaps in transverse alignment, and the supporting means permitting replacement of any damaged or inoperative head by another which assumes a position in alignment with the remaining heads.

Yet another object is to provide an improved mounting which supports a plurality of magnetic heads in exact head gap alignment and permits individual adjustments of the heads within the plane of gap alignment without introduring gap alignment errors.

The foregoing and other objects, features and advantages of the present invention will be apparent from the following more particular description of the preferred embodiments of the invention as illustrated in the accompanying drawings.

In the drawings:

FIG. 1 is a perspective view of a plurality of magnetic heads supported with their head gaps in alignment.

FIG. 2 includes perspective views of opposite portions of head supporting blocks turned at 90 degrees to each other and showing the head portions associated therewith.

Figures 1, 2, 3, 6:
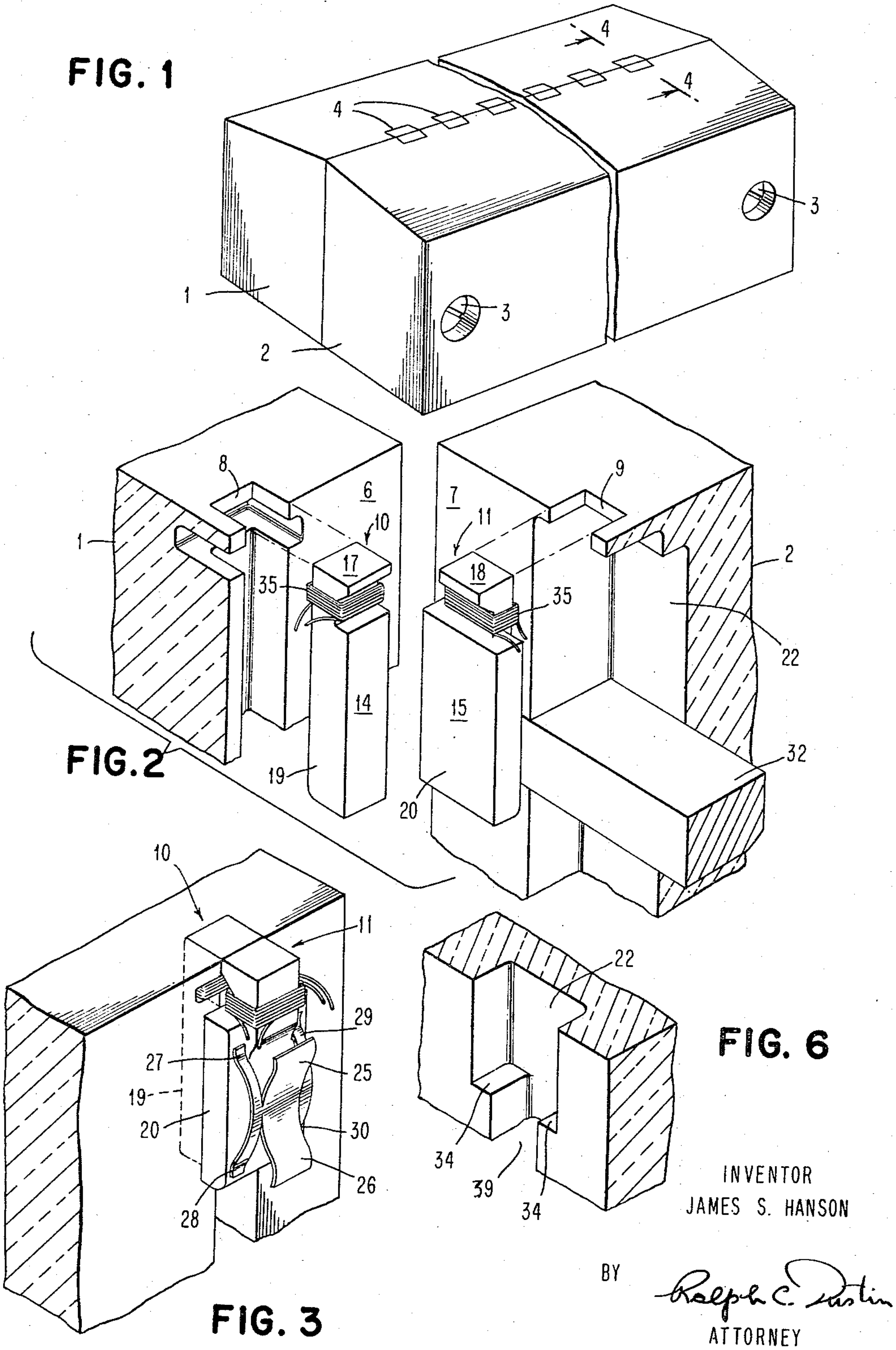
FIG. 3 is a perspective view of a portion of one supporting block and a complete magnetic head associated therewith.
FIG. 6 is a perspective view of a portion of one of the supporting blocks showing a different formation in its head receiving cavity.

Referring to FIG. 1 it will be noted that there is shown a pair of blocks 1 and 2 held together by bolts 3 and supporting between them a plurality of magnetic heads 4 with their gaps in exact alignment. When the heads are used to read or write information in different tracks on a magnetic surface, relative movement is caused to take place between the heads and the surface in a direction extending transversely of the vertical plane in which the head gaps are aligned.

In order to obtain an exact head gap alignment, the blocks 1 and 2 are provided with optically flat mating surfaces 6 and 7 in which recesses 8 and 9, respectively, are formed for receiving members 10 and 11 making up the heads 4. Blocks 1 and 2 are desirably made of a glass which can be produced strain-free in the desired shape, can be cut ultrasonically or by diamond discs, and whose surfaces can be lapped and polished to the desired optical flatness by conventional techniques. The head members 10 and 11 are made of a ferrite material and have mating surfaces 14 and 15 which are made optically flat. Before assembling the heads 4 in the blocks 1 and 2, the head members 10 and 11 are bonded together at their faces 14 and 15 by a material, which presents a magnetic discontinuity to a recording medium. It has been found that a glass can be selected to match the ferrite in physical properties such as hardness, wear-resistance, and thermal-expansion coefficient, and to provide a true atomic bond under sufficient heat and pressure. The glass can be applied to the head faces by any suitable method such as centrifugal deposition from a collodial suspension, or insertion of a glass shim, and, when bonded under heat and pressure, provides an ideal magnetic recording head.

Figure 4:
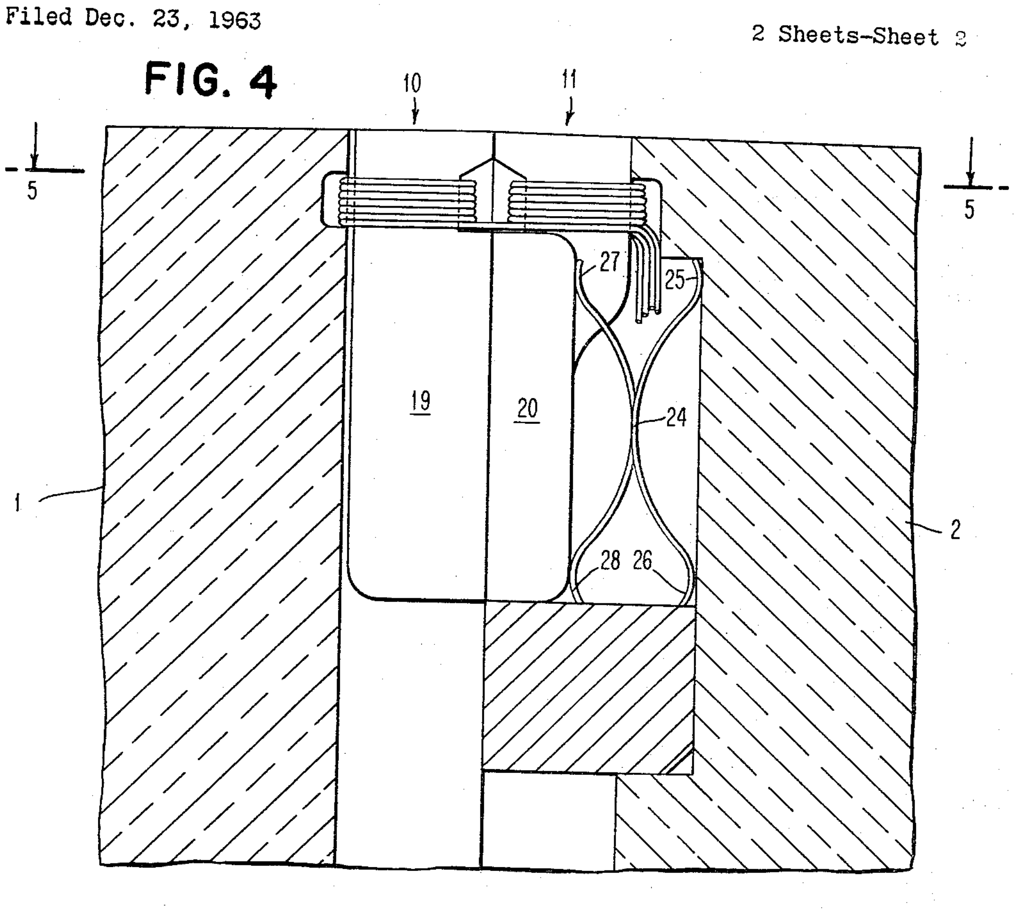
FIG. 4 is an enlarged vertical sectional view taken on the plane of the line 4—4 in FIG. 1.
Figure 5:
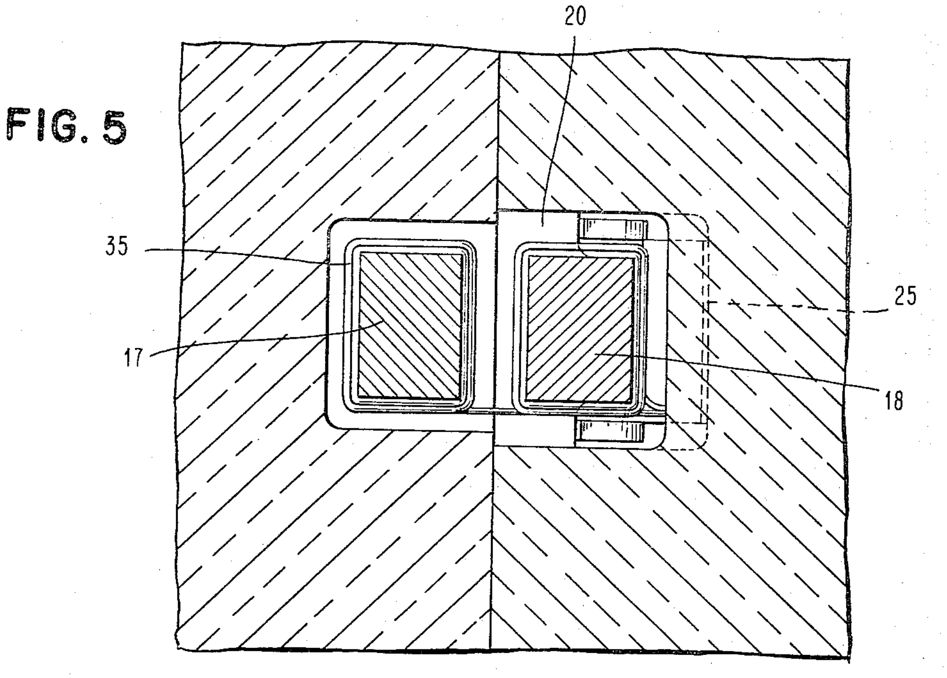
FIG. 5 is a horizontal sectional view taken on the plane of the line 5—5 in FIG. 4.

It will be noted in FIG. 2 that the members 10 and 11 have head portions 17 and 18 of the same shape and size but have body portions 19 and 20 of different width. As shown herein, the body portion 20 is somewhat wider than the portion 19 so that portions of the surface 15 extend beyond both edges of the surface 14 for engagement with the surface 6 on block 1 when the head members have been bonded together and mounted within the blocks 1 and 2. The recesses 8 in block 1 are made slightly wider than the members 10 to permit transverse adjustment of the latter and are made slightly deeper than the thickness of the members 10 so that the locating of heads 4 is determined by the engagement of the surfaces 15 on the head members 11 with the surface 6 on the block 1. Each recess 9 in block 2 is formed to receive the head portion 18 in the same manner that head portion 17 is received by recess 8. Below recess 9 is a wider and deeper cavity 22 which not only freely receives the body portion 20 but also receives a spring 24, as shown in FIG. 4, for urging the head member 11 in a direction to engage its surface 15 with the surface 6 on the block 1. Spring 24 is formed generally in an X shape with two central portions 25 and 26 of a spring element bent rearwardly to engage the back wall of the cavity 22 while four corner portions 27, 28, 29 and 30 are bent forwardly to engage the back side of the head member 11 at spaced points overlying the contacting surfaces 6 and 15. The arrangement is such that complete surface engagement between the overlapping portions of the head members with block 1 is assured, and the force of the springs is more than adequate to maintain the engagement during reading and writing operations.

The heads may be held at the proper level within the recesses 8 and 9 by a bar 32 fitting in a transverse slot in the head member 2 and providing a surface upon which the lower ends of the head members 11 rest, as shown in FIG. 4. If desired, the head members 2 may have slots or recesses 39 cut across the full front face, as shown in FIG. 6, and then have cavities 22 formed only long enough to receive the body portions 20 of the head members 2. This provides surfaces 34 at the lower end of the cavities on which the head members 11 may rest when the parts are assembled. Formed in the members 10 and 11 just below their head portions are recesses for receiving turns of wire 35. After the members have been bonded together and the turns of wire have been wrapped about them, the blocks 1 and 2 are positioned face to face with the head members enclosed in the recesses and held at the proper level by either the bar 32 or the surfaces 34. The springs 24 hold the heads with the gap surfaces 15 engaging a common flat surface 6, thereby assuring an exact gap alignment. If any vertical adjustment of a head is needed, shims may be placed between the lower end of the body portion 20 and the bar 32 or the surfaces 34. It will be noted that such adjustments of the heads have no effect on the transverse alignment of the gaps. After the heads, except for their upper ends, have been enclosed within the blocks and the bolts 3 have been tightened, the exposed ends of the heads may be lapped and polished to the desired contour.

While there have been shown and described in this application one form and a modification thereof, which the invention may assume in practice, it will be understood that it may be modified and embodied in various other forms without departing from the spirit of the appended claims.

What is claimed is:

1. A magnetic head structure comprising, in combination:

a first block having a flat surface in which a plurality of spaced recesses are formed;

a second block having a plurality of wider recesses communicating with the recesses in said first block;

magnetic head members received within said recesses in said first and second blocks, said head members in said second block having flat surfaces engageable with said flat surface on said first block;

means bonding said head members in said communicating recesses together so as to form uniform head gaps;

means acting on said head members supported by said second block for yieldingly holding their flat surfaces in engagement with the flat surface on said first block;

and means for clamping said blocks together.

2. The head structure of claim 1 including:

means for supporting said head members so their upper ends extend slightly above said blocks;

said yieldable holding means acting on said head members at widely spaced points to assure surface contact between said flat surfaces.

3. A magnetic head structure comprising, in combination:

a pair of blocks having optically flat mating faces;

pairs of recesses of different widths formed in said faces in communication with each other;

a magnetic head received within each of said pairs of recesses;

each of said magnetic heads including two head members, each fitting within one or the other of a pair of said recesses;

optically flat surfaces on adjacent sides of said head members;

means bonding said head members at their flat surfaces and providing between them a head gap;

said head members received within the wider ones of said pairs of recesses having portions of their optically flat surfaces overlying the optically flat surface on said block in which the narrower recesses are formed;

means acting on said magnetic heads for yieldingly holding surfaces on said head members supported by one of said pair of blocks in engagement with underlying surfaces on the other of said pair of blocks;

and means for clamping said pair of blocks together.

4. The head structure of claim 3 in which the head member received within the wider one of each pair of recesses overlies the optically flat block surface at both sides of the corresponding narrower recesses;

and said means acting on said magnetic heads operates at points in alignment with areas of engagement by said flat surfaces for maintaining such engagement.

5. A magnetic head structure comprising, in combination:

a first block having a flat surface in which a recess is formed;

a second block having a recess communicating with said first recess and being of somewhat greater width;

a magnetic head having portions fitting within said recesses and having flat surfaces engageable with said flat surface on said first block at opposite sides of the recess therein;

the position of said head within said recesses being determined solely by the engagement of said flat surfaces with each other;

and means acting between said second block and said head for maintaining engagement between said flat surfaces.

References Cited

UNITED STATES PATENTS

| | | | |
|---|---|---|---|
| 2,785,038 | 3/1957 | Ferber | 29—155.5 |
| 2,866,011 | 12/1958 | Kornei | 179—100.2 |
| 2,888,522 | 5/1959 | McCurchen et al. | 179—100.2 |
| 2,928,907 | 3/1960 | Lubkin | 179—100.2 |
| 3,041,413 | 6/1962 | Williams | 179—100.2 |
| 3,225,145 | 12/1965 | Warren | 340—174.1 |

BERNARD KONICK, *Primary Examiner.*

V. P. CANNEY, *Assistant Examiner.*